United States Patent [19]

Tsukamoto et al.

[11] Patent Number: 5,527,635

[45] Date of Patent: Jun. 18, 1996

[54] SOLID-ELECTROLYTE FUEL CELL ELECTRODE MATERIAL AND ELECTRODE USING SAME

[75] Inventors: Koichi Tsukamoto, Tokyo; Futoshi Uchiyama, Kashiwa; Takeshi Yanagisawa, Tsukuba; Takayasu Okuo, Tsukuba; Yasuo Kaga, Tsukuba, all of Japan

[73] Assignee: Agency of Industrial Science & Technology, Ministry of International Trade & Industry, Tokyo, Japan

[21] Appl. No.: 352,639

[22] Filed: Dec. 9, 1994

[30] Foreign Application Priority Data

Dec. 9, 1993 [JP] Japan ................................. 5-340756

[51] Int. Cl.$^6$ ................................................ H01M 4/86
[52] U.S. Cl. .............................. 429/40; 429/44; 429/45; 204/290 R; 204/291; 502/303
[58] Field of Search .................... 429/40, 44, 45; 204/291, 290 R; 502/303

[56] References Cited

U.S. PATENT DOCUMENTS 4,151,123 4/1979 McCann, III ........................... 502/303
4,276,202 6/1981 Schmidberger et al. .

*Primary Examiner*—Bruce F. Bell
*Attorney, Agent, or Firm*—Oblon, Spivak, McClelland, Maier & Neustadt

[57] ABSTRACT

Solid-electrolyte fuel cell electrode material in the form of a membrane formed on a solid electrolyte surface from a powder obtained by pulverizing a sintered body obtained by sintering a mixture of lanthanum-based electrode material and 5 to 50 mol % platinum.

8 Claims, 2 Drawing Sheets

1

SOLID-ELECTROLYTE FUEL CELL ELECTRODE MATERIAL AND ELECTRODE USING SAME

BACKGROUND OF THE INVENTION

1. Field of the Invention

This invention relates to solid-electrolyte fuel cell electrode material, and to an electrode formed of the material.

2. Description of the Prior Art

Conventionally, solid-electrolyte fuel cell electrodes are usually formed of $LaMnO_3$, $LaCoO_3$, $LaSrMnO_3$ or other such lanthanum-based material having good heat-resistance and a coefficient of thermal expansion that is close to that of the solid electrolyte material. To manufacture electrodes using such materials, the surface of a solid electrolyte such as stabilized zirconia is flame-coated with a powder of the electrode material, or coated with a slurry of the powder which is then sintered, producing an air electrode in the form of a porous membrane having good air permeability.

While such air electrodes are required to have good air permeability, they are also required to have good electrical conductivity. The conductivity of an air electrode is highly dependent on its air permeability, but higher permeability means decreased density, with a corresponding decrease in conductivity; that is, the electrical resistance is increased.

An object of the present invention is to provide a solid-electrolyte fuel cell electrode which provides a major improvement in conductivity without a reduction in air permeability.

SUMMARY OF THE INVENTION

To attain the above object, the present invention provides solid-electrolyte fuel cell electrode material comprising a particulate material obtained by pulverizing a sintered body obtained by sintering lanthanum-based electrode material containing 5 to 50 mol % platinum.

The above object is also attained by a solid-electrolyte fuel cell electrode comprising a membrane formed by sintering a solid electrolyte coated with the above particulate electrode material.

When platinum is thus added to conventional electrode material and the result then sintered and pulverized as described above, the platinum is distributed and sintered on the surface of each powder particle formed by the pulverization. By using this powdered electrode material to form a membrane air electrode on the surface of a solid electrolyte, it is possible to achieve a major improvement in conductivity while at the same time maintaining an air permeability that is substantially the same as that of conventional electrodes.

Further features of the invention, its nature and various advantages will be more apparent from the accompanying drawings and following detailed description of the invention.

DESCRIPTION OF THE PREFERRED EMBODIMENT

Figure 1:
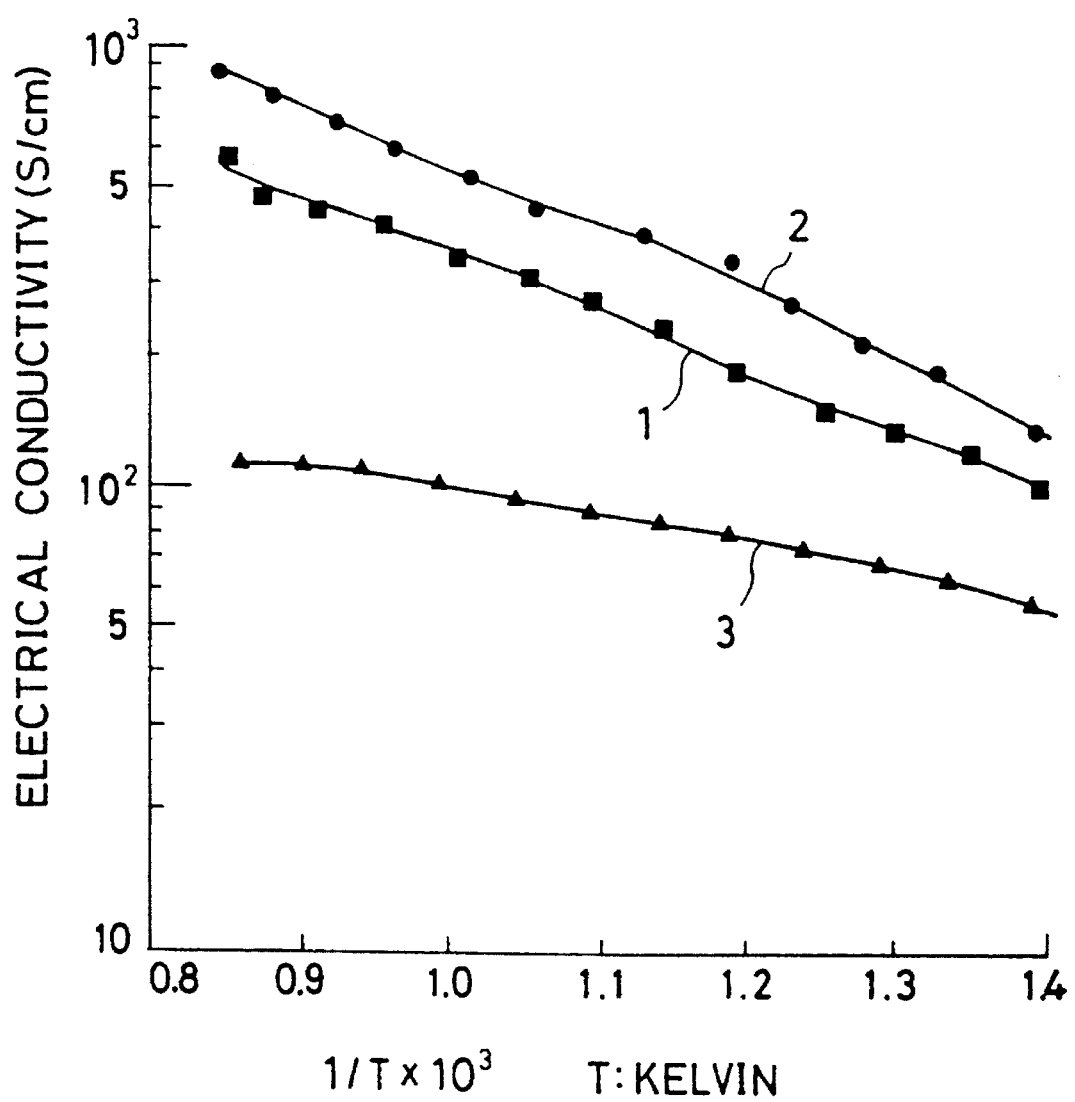
FIG. 1 is a graph showing the relationship between conductivity and temperature in the case of electrodes of this invention and a conventional electrode.

Conventional lanthanum-based material such as $LaMnO_3$, $LaCoO_3$ or $LaSrMnO_3$ powder may be used as the solid-electrolyte fuel cell electrode material of this invention. The powder particles should be from 5 to 50 μm in diameter. The platinum powder added to the lanthanum electrode material should have a particle diameter that does not exceed 5 μm. The amount of platinum added should be in the range of 5 to 50 mol %. Added platinum that is less than 5% does not provide a sufficient contribution to the conductivity, while exceeding 50% can cause degradation of air permeability in the electrode thus formed.

The lanthanum-based electrode material powder and platinum powder are mixed in prescribed proportions and the mixture sintered by heating it at between 1000° C. and 1200° C. for 20 to 30 hours. The temperature is raised and lowered for sintering and cooling at a slow rate of around 3° C. to 5° C. per minute. A known, appropriate method is then used to pulverize the sintered body to form a powder with a particle diameter of 5 to 50 μm. If required, the above sintering and pulverizing may be repeated a number of times to ensure that the platinum is uniformly distributed and sintered on the surface of the particles.

Laser spray coating, plasma spray coating, laser-plasma hybride spray coating, slurry coating or other such method is then used to apply the electrode material to the surface of a solid electrolyte to thereby produce a membrane forming the electrode of a solid-electrolyte fuel cell.

Owing to the addition of platinum, the electrode thus obtained has a markedly improved conductivity and retains its porosity. The reason for this is considered to be that the particles are connected by the sintered platinum on the particle surfaces.

An embodiment of the invention will now be described. Approximately 10 mol % of platinum powder having a particle diameter of about 3 μm was added to an electrode material of powdered $LaCoO_3$ having a particle diameter in the approximate range of 10 to 30 μm and the mixture was sintered by heating it at around 1100° C. for about 20 hours. The sintered body thus obtained was then pulverized to obtain a powdered electrode material with a particle diameter of around 30 μm.

Using the laser spraying method disclosed by U.S. Pat. No. 5,208,431, the surface of a solid electrolyte of stabilized zirconia was irradiated without direct contact with the melting laser beam while passing the powdered electrode material through the laser beam, thereby depositing the powder on the surface of the solid electrolyte to form the electrode. The electrode thus formed was porous and about 100 μm thick, and had a conductivity of 500 S/cm. Another electrode, this time containing 20 mol % of platinum and formed on the solid electrolyte by the same method, exhibited a conductivity of 900 S/cm.

For comparison, $LaCoO_3$ with no added platinum was used to form two electrode membranes on the surface of solid electrolytes, one by the conventional plasma spraying method and the other by the above laser spraying method. At high-temperature regions the $LaCoO_3$ electrode obtained using the plasma spraying method had a conductivity of 200 S/cm, while the $LaCoO_3$ electrode produced using the laser spraying method had a conductivity of 135 S/cm. This shows that an electrode made from a sintered powder material containing 20 mol % platinum had about seven times the conductivity of an electrode made from a material containing no added platinum.

FIG. 1 shows the conductivity-temperature relationship of electrodes formed by laser spraying of a sintered powder of $LaCoO_3$ containing 10 mol % of added platinum (Curve 1) and 20 mol % of added platinum (Curve 2), and the conductivity-temperature relationship of a $LaCoO_3$ electrode formed by laser spraying (Curve 3). From these curves it can be seen that, compared with a conventional electrode, the electrodes of this invention have very good conductivity at low temperature regions.

Figure 2:
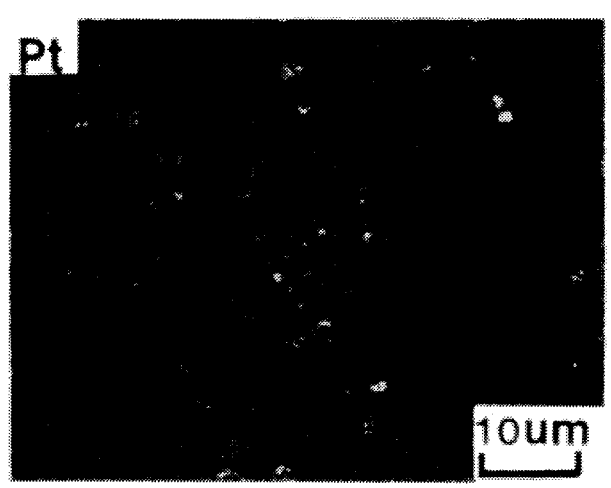
FIG. 2 is a micrograph obtained with an electron probe micro-analyzer showing the platinum distribution on the surface of an electrode formed of $LaCoO_3$ containing 20 mol % added platinum.
Figure 3:
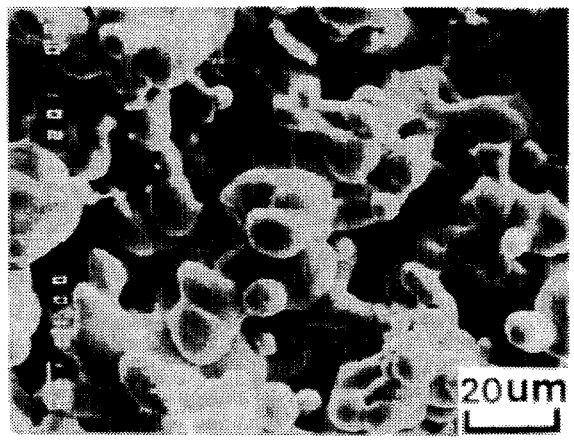
FIG. 3 is a micrograph of the surface of an electrode formed of $LaCoO_3$ containing 20 mol % added platinum.
Figure 4:
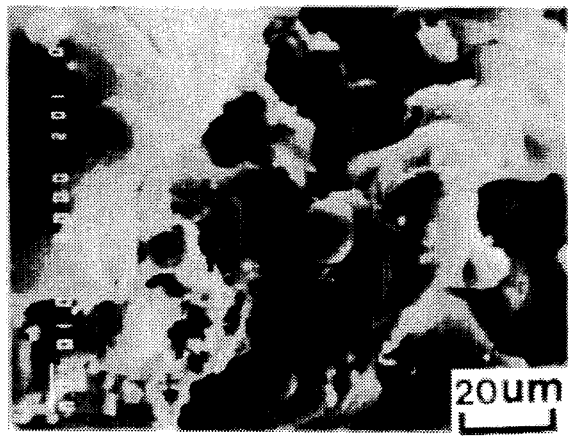
FIG. 4 is a micrograph of the surface of an electrode formed by a laser spray coating of conventional $LaCoO_3$ powder.

FIG. 2 is a micrograph obtained with an electron probe micro-analyzer, showing the platinum distribution on the surface of an electrode formed of $LaCoO_3$ containing 20 mol % added platinum. It can be seen from this that the platinum, the white spots, is uniformly distributed on the $LaCoO_3$ particles. FIG. 3 is a micrograph of the surface of the above electrode, showing it has substantially the same density as that of the conventional electrode with no added platinum shown in FIG. 4.

Thus, compared to an electrode containing no added platinum, with the solid-electrolyte fuel cell electrode according to this invention a porous membrane is obtained that exhibits over a seven-fold improvement in conductivity and also has good air permeability, which has a bearing on the power generating efficiency. In addition, the electrode of this invention exhibits much better low-temperature conductivity than conventional electrodes, and as such can help to provide a major improvement in the low-temperature generating performance of solid electrolyte fuel cells.

What is claimed is:

1. Solid-electrolyte fuel cell electrode material comprising a particulate material obtained by pulverizing a sintered body obtained by sintering a lanthanum-based electrode material containing 5 to 50 mol % platinum at a temperature of 1000° C. to 1200° C. for 20 to 30 hours.

2. An electrode material according to claim 1, in which the platinum is in the form of a powder having a particle diameter not exceeding 5 μm.

3. An electrode material according to claim 1, in which platinum is distributed and sintered on the surface of each powder particle.

4. An electrode material according to claim 1, wherein said lanthanum-based electrode material is $LaMnO_3$, $LaCoO_3$ or $LaSrMnO_3$.

5. A solid-electrolyte fuel cell electrode comprising a membrane formed on a solid electrolyte surface from a powder obtained by pulverizing a sintered body obtained by sintering a lanthanum-based electrode material containing 5 to 50 mol % platinum at a temperature of 1000° C. to 1200° C. for 20 to 30 hours.

6. An electrode according to claim 5, in which the platinum is in the form of a powder having a particle diameter not exceeding 5 μm.

7. An electrode according to claim 5, in which platinum is distributed and sintered on the surface of each particle of the pulverized sintered body.

8. An electrode material according to claim 5, wherein said lanthanum-based electrode material is $LaMnO_3$, $LaCoO_3$ or $LaSrMnO_3$.

* * * * *